United States Patent
Adachi et al.

(10) Patent No.: US 11,705,572 B2
(45) Date of Patent: Jul. 18, 2023

(54) FUEL CELL AND MANUFACTURING METHOD OF THE SAME

(71) Applicant: TOYOTA JIDOSHA KABUSHIKI KAISHA, Toyota (JP)

(72) Inventors: Makoto Adachi, Nagakute (JP); Katsuhiko Kinoshita, Nisshin (JP); Yu Ashitaka, Toyota (JP); Naohiro Mitani, Okazaki (JP); Yusuke Watanabe, Miyoshi (JP); Kenji Sato, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 467 days.

(21) Appl. No.: 17/012,164

(22) Filed: Sep. 4, 2020

(65) Prior Publication Data

US 2021/0159533 A1    May 27, 2021

(30) Foreign Application Priority Data

Nov. 27, 2019  (JP) .................. 2019-213807

(51) Int. Cl.
*H01M 8/242* (2016.01)
*H01M 8/1004* (2016.01)

(52) U.S. Cl.
CPC ......... *H01M 8/242* (2013.01); *H01M 8/1004* (2013.01)

(58) Field of Classification Search
CPC ... H01M 8/1004; H01M 8/242; H01M 8/0273
See application file for complete search history.

(56) References Cited

U.S. PATENT DOCUMENTS

| | | | |
|---|---|---|---|
| 2009/0087713 | A1 | 4/2009 | Yoshida et al. |
| 2014/0120452 | A1 | 5/2014 | Yamauchi et al. |
| 2017/0358806 | A1 | 12/2017 | Shizuku et al. |
| 2019/0198889 | A1 | 6/2019 | Nishida |

FOREIGN PATENT DOCUMENTS

| | | |
|---|---|---|
| JP | 2018185977 A | 11/2018 |
| JP | 2019-117721 A | 7/2019 |
| JP | 2019110041 A | 7/2019 |
| KR | 10-2008-0081039 A | 9/2008 |

*Primary Examiner* — Sarah A. Slifka
(74) *Attorney, Agent, or Firm* — Dickinson Wright, PLLC

(57) ABSTRACT

A fuel cell includes a membrane electrode assembly having electrodes disposed on both surfaces of an electrolyte membrane, a gas diffusion layer stacked on one surface of the membrane electrode assembly, a resin frame assembled onto the one surface of the membrane electrode assembly so as to surround the outer periphery of the gas diffusion layer apart from the outer periphery of the gas diffusion layer, and a resin sheet disposed between the gas diffusion layer and the resin frame, and the membrane electrode assembly so as to fill a space between the inner periphery of the resin frame and the outer periphery of the gas diffusion layer.

4 Claims, 12 Drawing Sheets

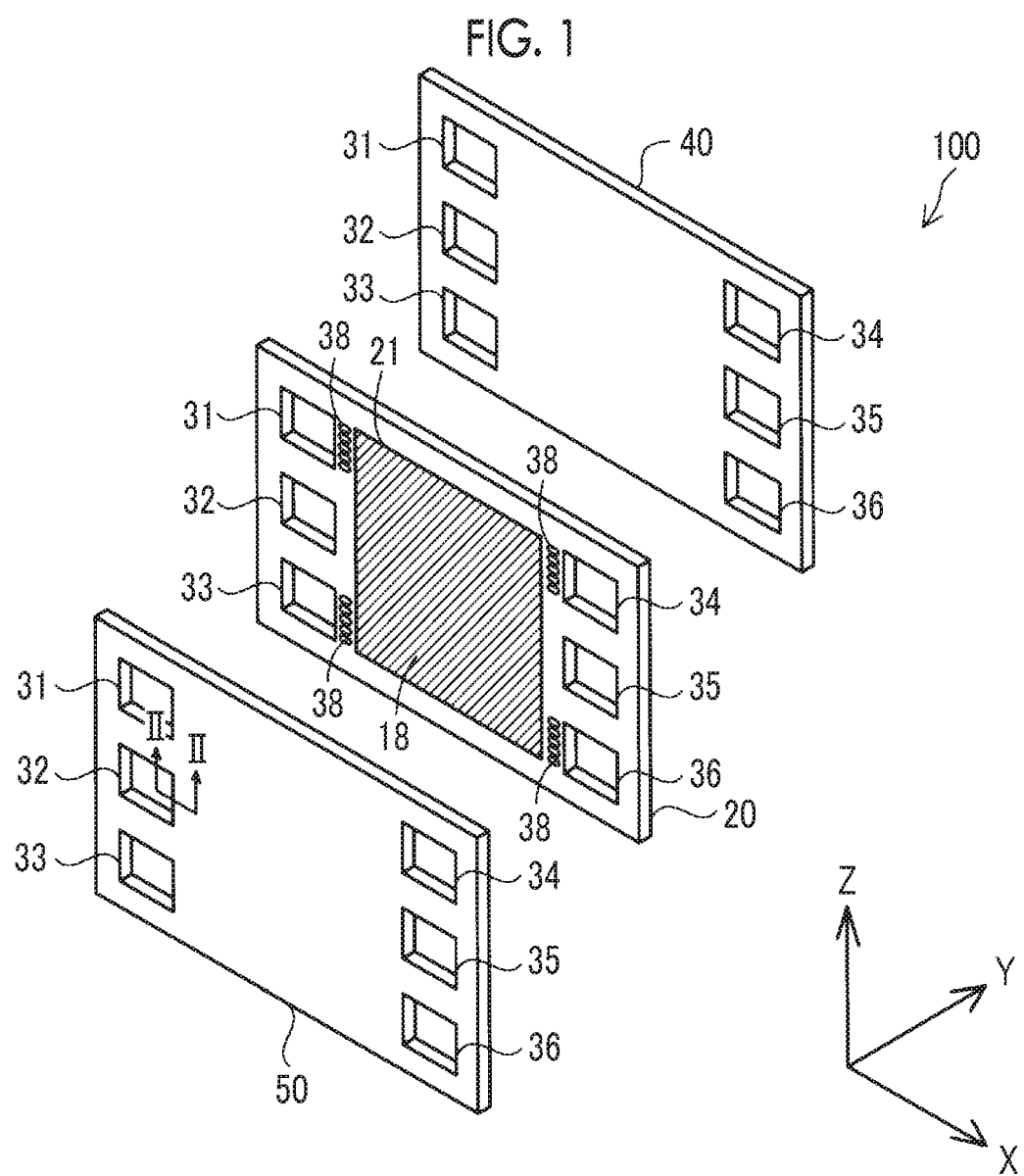

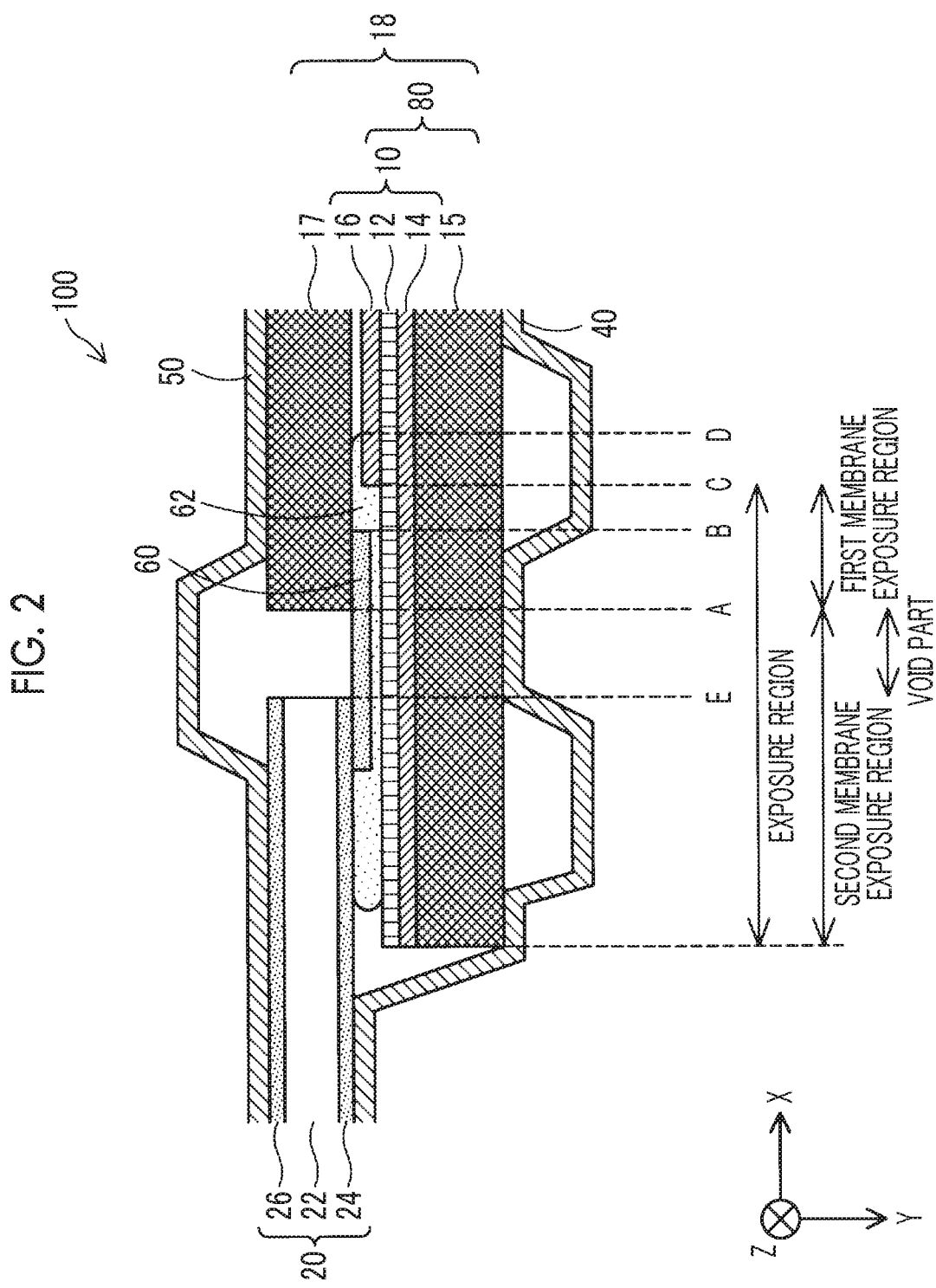

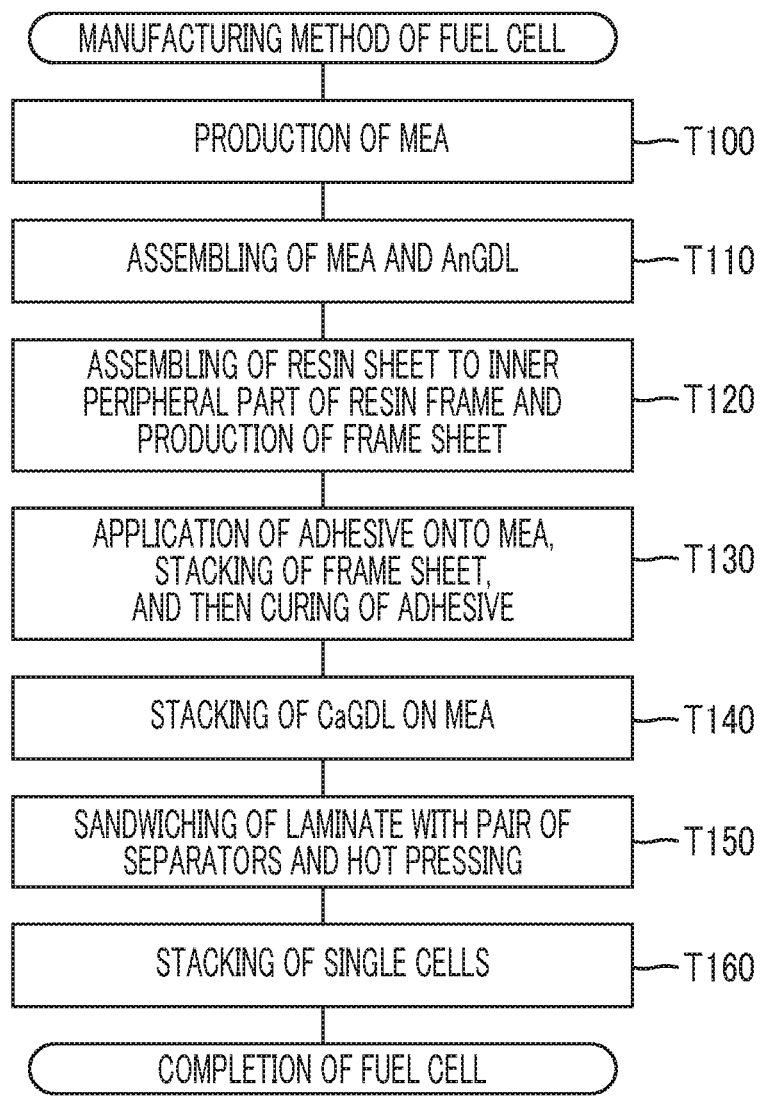

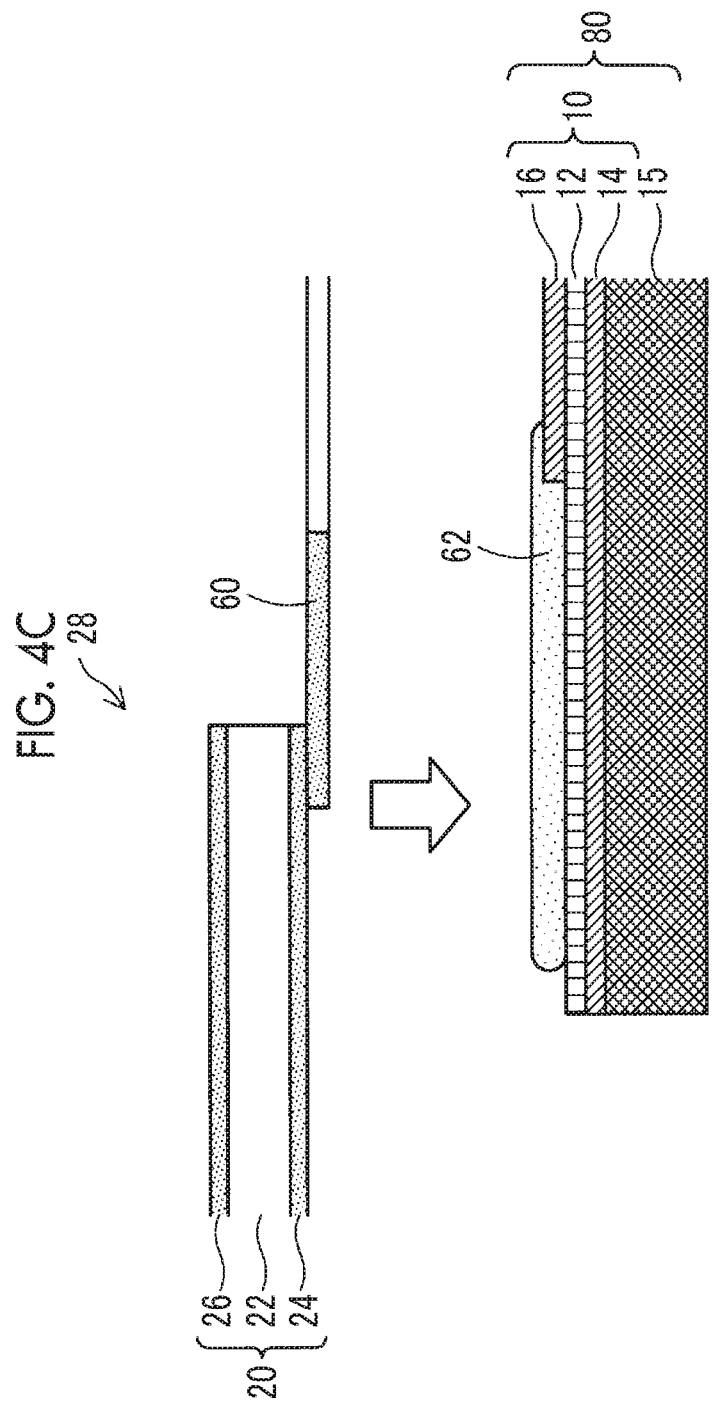

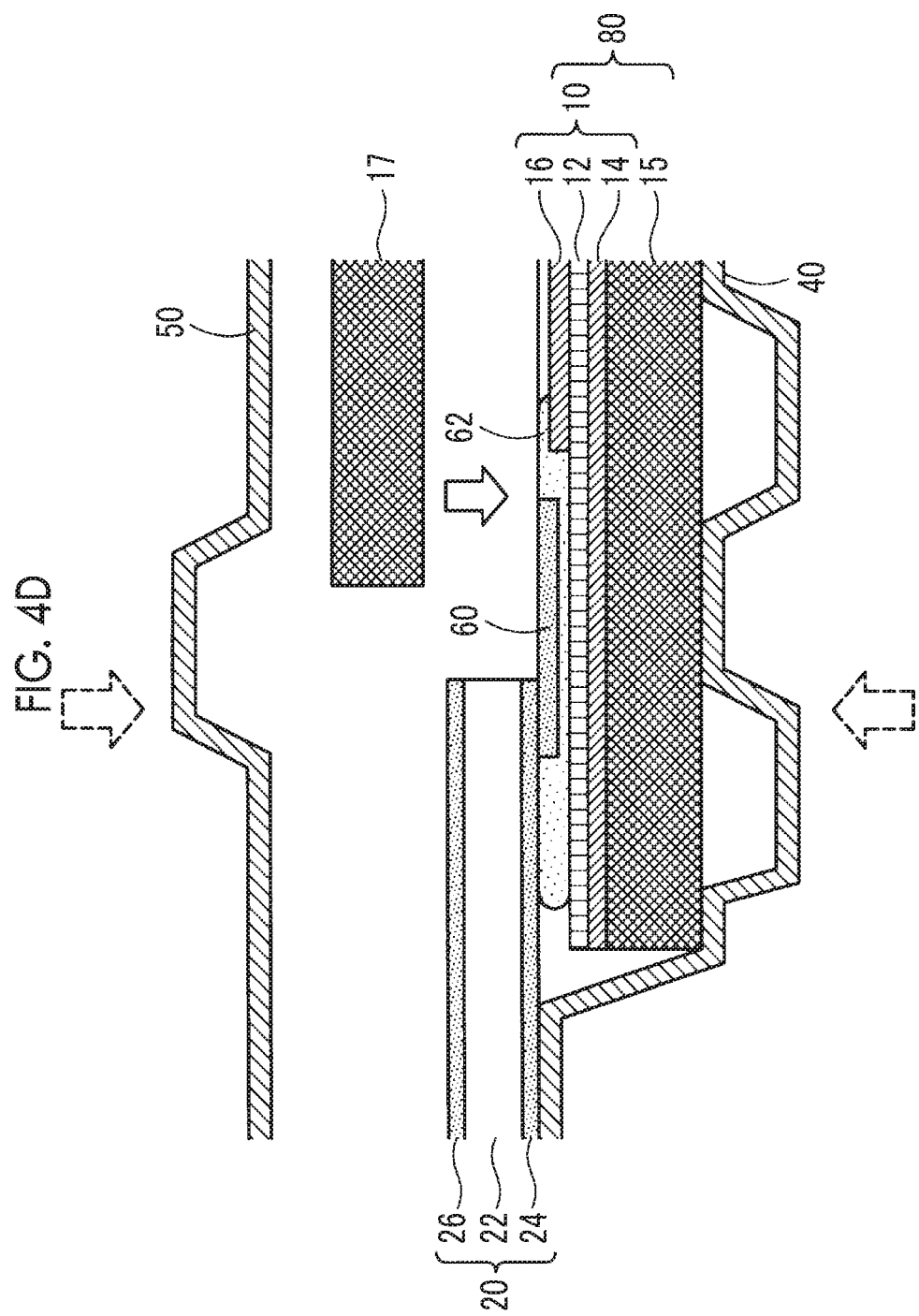

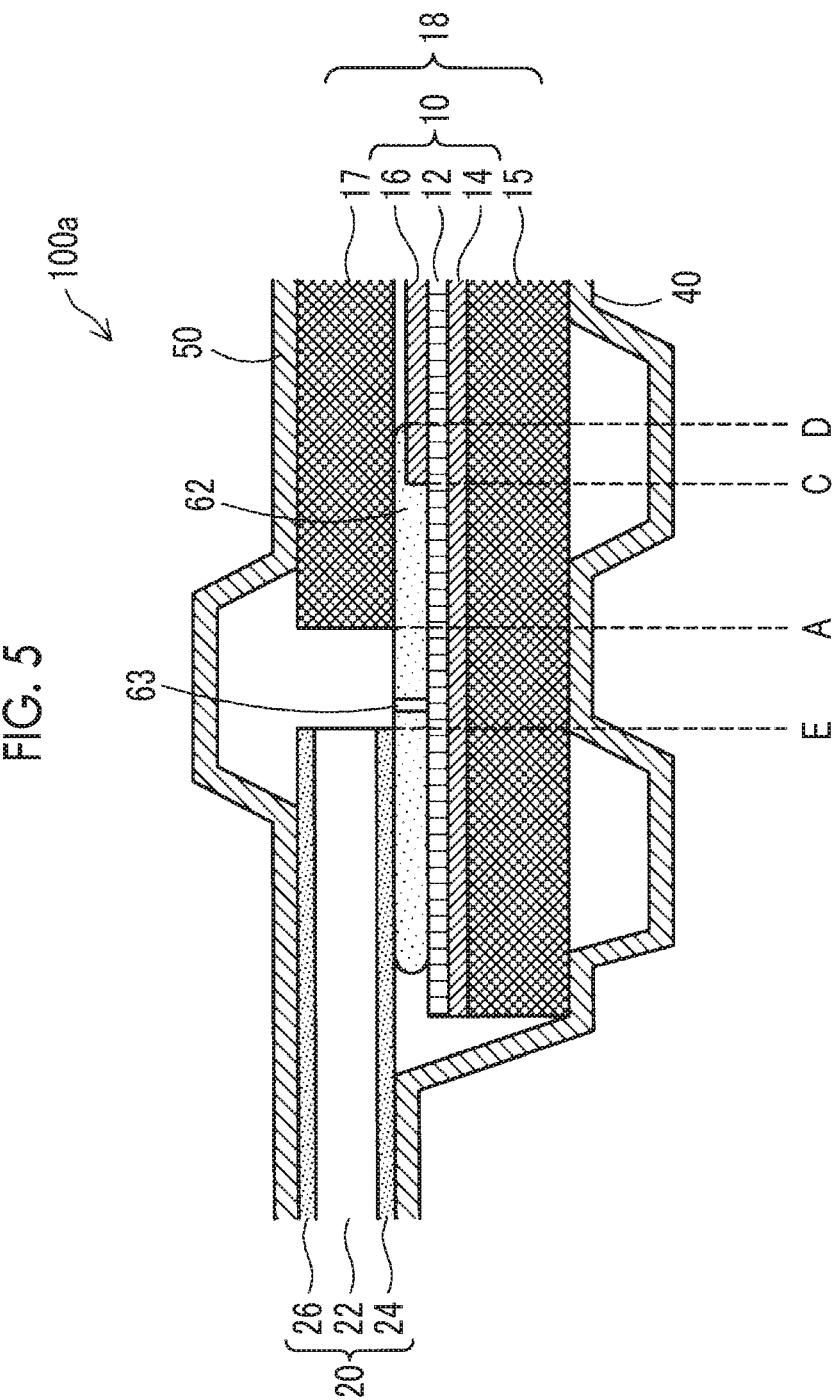

FUEL CELL AND MANUFACTURING METHOD OF THE SAME

INCORPORATION BY REFERENCE

The disclosure of Japanese Patent Application No. 2019-213807 filed on Nov. 27, 2019 including the specification, drawings and abstract is incorporated herein by reference in its entirety.

BACKGROUND

1. Technical Field

The present disclosure relates to a fuel cell and a manufacturing method of the same.

2. Description of Related Art

Generally, a fuel cell is formed by stacking single cells each including a pair of gas separators and a membrane electrode assembly (hereinafter, also referred to as MEA) disposed between the gas separators. As such a fuel cell, known is a configuration in which a frame-shaped resin frame is assembled to the outer peripheral part of the MEA so as to surround the MEA, and the resin frame and each gas separator adhere to each other (for example, Japanese Unexamined Patent Application Publication No. 2019-110041).

SUMMARY

In the MEA, there are a part that is assembled to the resin frame, a part sandwiched between a pair of gas diffusion layers that is disposed between the MEA and the gas separators, and the like. Therefore, for example, when the temperature of the fuel cell including the MEA changes, and the resin frame included in the fuel cell expands and contracts, a part where stress is concentrated may be generated in the MEA. As a result of such stress concentration, there is a possibility that the durability of the MEA may degrade.

A first aspect of the present disclosure relates to a fuel cell. The fuel cell includes a membrane electrode assembly having electrodes disposed on both surfaces of an electrolyte membrane, a gas diffusion layer stacked on a first surface of the membrane electrode assembly, a resin frame assembled onto the first surface of the membrane electrode assembly so as to surround the outer periphery of the gas diffusion layer apart from the outer periphery of the gas diffusion layer, and a resin sheet disposed between the gas diffusion layer and the resin frame, and the membrane electrode assembly so as to fill a space between the inner periphery of the resin frame and the outer periphery of the gas diffusion layer.

With the first aspect, since the resin sheet is disposed between the gas diffusion layer and the resin frame, and the membrane electrode assembly so as to fill the space between the inner periphery of the resin frame and the outer periphery of the gas diffusion layer, it is possible to physically reinforce a part of the membrane electrode assembly in which stress is likely to be concentrated with the resin sheet and to suppress the degradation of the durability of the membrane electrode assembly.

The first aspect may further include an adhesive layer made of an adhesive between the resin frame, the resin sheet, and the gas diffusion layer, and the membrane electrode assembly. In addition, a region of the membrane electrode assembly that overlaps the outer peripheral part of the gas diffusion layer may include a membrane exposure region in which the electrode is not disposed on the first surface of the membrane electrode assembly. In addition, the resin sheet may include a part that overlaps the membrane exposure region in the membrane electrode assembly, the adhesive layer, and the gas diffusion layer in a stacking direction of the gas diffusion layer, and the overlapping part may include a void that penetrates the resin sheet in the stacking direction and allows the disposition of the adhesive in the void.

The first aspect enables the membrane exposure region of the membrane electrode assembly and the gas diffusion layer to be fixed to each other with the adhesive layer through the void. Therefore, for example, in the manufacturing process of the fuel cell, it is possible to suppress the positional deviation of the gas diffusion layer with respect to the electrolyte membrane.

In the first aspect, the membrane exposure region of the membrane electrode assembly may be covered with at least one of the adhesive layer and the resin sheet, and, in the membrane exposure region of the membrane electrode assembly, a part that is covered with the resin sheet may include a region in which the adhesive layer is not disposed.

With the first aspect, it is possible to decrease the amount of the adhesive forming the adhesive layer while the membrane exposure region is protected against the contact with the gas diffusion layer with at least one of the adhesive layer and the resin sheet.

The first aspect may further include a pair of gas separators that sandwiches a structure including the membrane electrode assembly, the gas diffusion layer, the resin frame, and the resin sheet. The resin frame may include adhesive resin layers for the adhesion of the gas separators on both surfaces of the resin frame, and the adhesive resin layer is a layer containing a thermoplastic resin having adhesiveness. The resin sheet may be made of a thermoplastic resin.

The first aspect enables the enhancement of the adhesion between the resin frame and the gas separator and the adhesion strength between the resin frame and the resin sheet.

A second aspect relates to a manufacturing method of a fuel cell. The manufacturing method of a fuel cell includes sandwiching a region in which an inner peripheral part of the resin frame and an outer peripheral part of the resin sheet overlap each other with an ultrasonic horn and a clamping jig while a sticking suppression portion configured to suppress the sticking of a molten thermoplastic resin is interposed between the ultrasonic horn and the clamping jig, and transmitting an ultrasonic vibration from the ultrasonic horn to the resin frame and the resin sheet to ultrasonically weld the resin frame and the resin sheet.

With the second aspect, it is possible to suppress the thermoplastic resin, which forms the resin sheet or the resin frame, from sticking to the clamping jig or the ultrasonic horn even when the thermoplastic resin melts during the assembling of the resin frame and the resin sheet by ultrasonic welding.

The present disclosure can also be realized in a variety of forms other than the fuel cell. For example, the present disclosure can be realized in the form of a single cell for a fuel cell, a manufacturing method of a single cell, a protection method of a membrane electrode assembly in a fuel cell, or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is an exploded perspective view of the schematic configuration of a fuel cell;

FIG. 2 is a schematic cross-sectional view of the appearance of the II-II cross-section in FIG. 1;

FIG. 3 is a flowchart of a manufacturing method of the fuel cell;

FIG. 4C is a schematic cross-sectional view of the appearance of the fuel cell in the middle of manufacturing;

FIG. 4D is a schematic cross-sectional view of the appearance of the fuel cell in the middle of manufacturing;

FIG. 5 is a schematic cross-sectional view of the schematic configuration of a single cell as a comparative example;

DETAILED DESCRIPTION OF EMBODIMENTS

First Embodiment

Overall Configuration of Fuel Cell

Figure 4A:
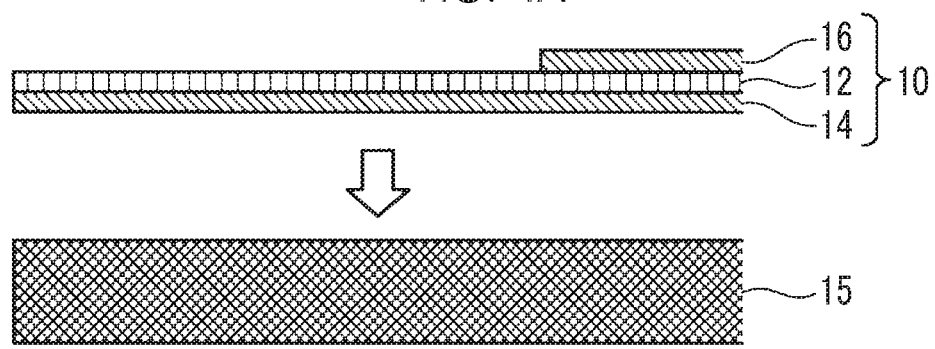
FIG. 4A is a schematic cross-sectional view of the appearance of the fuel cell in the middle of manufacturing.

FIG. 1 is an exploded perspective view of the schematic configuration of a fuel cell as a first embodiment of the present disclosure. In addition, FIG. 2 is a schematic cross-sectional view of the appearance of the II-II cross-section in FIG. 1. Hereinafter, the overall configuration of the fuel cell will be described based on FIG. 1 and FIG. 2. FIG. 1 and FIG. 2 show the configuration of a single cell 100, and the fuel cell of the present embodiment has a stack structure in which the single cells 100 are stacked. In the present specification, both a single cell and a fuel cell stack in which the single cells are stacked will be referred to as a fuel cell. The fuel cell of the present embodiment is a polymer electrolyte fuel cell, but can also be a different type of fuel cell such as a solid oxide-type fuel cell. Among the X direction, the Y direction, and the Z direction that are perpendicular to each other, which are shown in FIG. 1, FIG. 2, and FIG. 8 to FIG. 12 shown below, the Y direction is the stacking direction of the single cells 100 (also simply referred to as the stacking direction). FIG. 1, FIG. 2, and each of the drawings shown below schematically show the appearance of each portion of the fuel cell of the present embodiment, but the size of each portion shown in the drawings does not indicate a specific size.

The single cell 100 includes a pair of gas separators 40, 50, a membrane electrode gas diffusion layer assembly (MEGA) 18 disposed between the gas separators 40, 50, a resin frame 20 disposed outside the MEGA 18 in contact with the outer periphery of the MEGA 18 between the gas separators 40, 50, a resin sheet 60, and an adhesive layer 62.

As shown in FIG. 2, the MEGA 18 includes an electrolyte membrane 12, an anode 14 and a cathode 16 stacked on either surface of the electrolyte membrane 12. The structure in which the anode 14, the electrolyte membrane 12, and the cathode 16 are stacked in this order is also referred to as membrane electrode assembly (MEA) 10. In the MEGA 18, a gas diffusion layer 15 (hereinafter, also referred to the AnGDL 15) is further disposed on the anode 14, and a gas diffusion layer 17 (hereinafter, also referred to as CaGDL 17) is further disposed on the cathode 16. The electrolyte membrane 12 is a proton-conductive ion exchange membrane formed of a polymer electrolyte material, for example, a fluororesin, and exhibits favorable proton conductivity in a wet state. The anode 14 and the cathode 16 are formed by, for example, coating conductive particles carrying a catalyst, for example, carbon particles, with a polymer electrolyte having proton conductivity. The catalyst is platinum or a platinum alloy. The gas diffusion layers 15, 17 are made of a member having gas permeability and electron conductivity and can be formed of, for example, a carbon member such as carbon cloth or carbon paper, or a metal member such as foam metal or metal mesh.

In the single cell 100 of the present embodiment, each portion that configures the MEGA 18 is formed in a rectangular shape. In the present embodiment, as shown in FIG. 2, the electrolyte membrane 12, the anode 14, and the AnGDL 15 (hereinafter, also referred to as the electrolyte membrane or the like) have almost the same size as each other and are stacked such that the outer peripheries of the electrolyte membrane, the anode, and the AnGDL almost coincide. In contrast, the CaGDL 17 is smaller in both length and width than the electrolyte membrane or the like, and the entire outer periphery of the CaGDL 17 is disposed apart from and inside the outer periphery of the electrolyte membrane or the like. In addition, the cathode 16 is smaller in both length and width than the CaGDL 17, and the entire outer periphery of the cathode 16 is disposed apart from and inside the outer periphery of the CaGDL 17. On the surface of the MEA that is provided with the CaGDL 17 in the outer peripheral part of the MEA 10, a region in which the surface of the electrolyte membrane 12 is not covered with the cathode 16 is also referred to as the "exposure region". The exposure region includes a "first membrane exposure region" that overlaps the CaGDL 17 when seen in the stacking direction and a "second membrane exposure region" that does not overlap the CaGDL 17. The first membrane exposure region is also simply referred to as the "membrane exposure region".

In FIG. 2, when seen in the stacking direction in which the CaGDL 17 is stacked on the MEA 10 (the same as the stacking direction of the single cells), a position that overlaps the outer periphery of the CaGDL 17 is indicated as the "position A", and a position that overlaps the outer periphery of the cathode 16 is indicated as the "position C". The first membrane exposure region is a region from the position A to the position C in the MEA 10, and the second membrane exposure region is a region on the outer peripheral side of the position A, that is, a region in the negative X direction with respect to the position A in the cross-section of FIG. 2. Furthermore, in FIG. 2, when seen in the stacking direction, a position that overlaps the inner periphery of the resin sheet 60 is indicated as the "position B", and a position that overlaps the inner periphery of the adhesive layer 62 is indicated as the "position D".

The resin frame 20 is formed using a resin and has an outer shape that is shaped in a rectangular frame shape. An opening in the center of the resin frame 20 is a holding region of the MEGA 18, that is, a holding region of the MEA 10. The resin frame 20 is disposed so as to surround the outer periphery of the CaGDL 17 apart from the outer periphery of the CaGDL 17. In addition, the resin frame 20 is assembled to the MEA 10 through the adhesive layer 62 on the surface of the MEA on which the electrolyte membrane 12 is exposed in the second membrane exposure region. The resin frame 20 is further assembled to the resin sheet 60 as described below in the inner peripheral part of the resin frame. In addition, as shown in FIG. 1, the resin frame 20 is provided with a plurality of slit portions 38. The slit portions 38 will be described below in detail. As shown in FIG. 2, the resin frame 20 of the present embodiment has a structure in which a first adhesive layer 24, a core layer 22, and a second adhesive layer 26 are stacked in this order.

As the resin forming the first adhesive layer 24 and the second adhesive layer 26, it is possible to use a thermoplastic resin having adhesiveness, for example, a modified polyolefin such as modified polypropylene having adhesiveness imparted by the introduction of a functional group (for example, ADMER manufactured by Mitsui Chemicals, Inc.; ADMER is a registered trademark). As the thermoplastic resin having adhesiveness, in addition to the polyolefin-based resin, a variety of resins such as a silicone-based resin, an epoxy resin, and a urethane resin can be used, and a silane coupling agent may be blended. The resin forming the first adhesive layer 24 and the resin forming the second adhesive layer 26 may be the same type of resin or different types of resins. The first adhesive layer 24 and the second adhesive layer 26 are also referred to as the "adhesive resin layer". For the core layer 22, it is possible to use, for example, a resin selected from polypropylene (PP), a phenolic resin, an epoxy resin, polyethylene terephthalate (PET), and polyethylene naphthalate (PEN). In the present embodiment, the first adhesive layer 24 and the second adhesive layer 26 are formed of the modified polypropylene, and the core layer 22 is formed of polypropylene. The adhesive resin layers provided on both surfaces of the resin frame 20 facilitates the adhesion between the resin frame 20 and the gas separators 40, 50 by hot pressing.

The resin sheet 60 has an outer shape that is shaped in a rectangular frame shape and is disposed between the CaGDL 17 and the resin frame 20, and the MEA 10 so as to fill the space between the inner periphery of the resin frame 20 and the outer periphery of the CaGDL 17. That is, the resin sheet 60 is a member for protecting a part of the MEA 10 that overlaps the gap between the inner periphery of the resin frame 20 and the outer periphery of the CaGDL 17 in the stacking direction (hereinafter, also referred to as the void part). In FIG. 2, as described above, the position that overlaps the outer periphery of the CaGDL 17 when seen in the stacking direction is indicated as the "position A". In addition, the position that overlaps the inner periphery of the resin frame 20 when seen in the stacking direction is indicated as the "position E". The void part is a range from the position A to the position E. As shown in FIG. 2, the resin sheet 60 is disposed such that, when seen in the stacking direction, the outer peripheral part of the resin sheet 60 and the inner peripheral part of the resin frame 20 overlap each other, and the inner peripheral part of the resin sheet 60 and the outer peripheral part of the CaGDL 17 overlap each other. The overlap between the outer peripheral part of the resin sheet 60 and the inner peripheral part of the resin frame 20 and the overlap between the inner peripheral part of the resin sheet 60 and the outer peripheral part of the CaGDL 17 needs to be determined depending on the accuracy of the position alignment during the manufacturing of the single cell 100 such that the resin sheet 60 fills the void part without any gap. However, the resin sheet 60 simply needs to be disposed so as to fill the void part without any gap, and it is not indispensable to dispose the resin sheet 60 to be overlapped by the resin frame 20 and the gas diffusion layer 17 when seen in the stacking direction in order for the effect of physical reinforcement or the like described below.

The resin forming the resin sheet 60 needs to be stable in the internal environment of the fuel cell, in which the resin sheet 60 is disposed, and needs to have a melting point higher than the operating temperature of the fuel cell. The resin forming the resin sheet 60 is desirably a thermoplastic resin and more desirably a thermoplastic resin having a melting point of 200° C. or lower from the viewpoint of ensuring the adhesiveness to the resin frame 20. In addition, the resin forming the resin sheet 60 is, similar to the resin forming the first adhesive layer 24 and the second adhesive layer 26 in the resin frame 20, desirably a thermoplastic adhesive resin having adhesiveness, and from the viewpoint of enhancing the adhesiveness to the resin frame 20, more desirably the same type of resin as the resin forming the first adhesive layer 24. Examples of the thermoplastic resin forming the resin sheet 60 include polyethylene, polypropylene, or polyisobutylene (PIB). In the present embodiment, the resin sheet 60 is formed of polypropylene, which is a thermoplastic resin.

The resin sheet 60 is in contact with the void part of the MEA 10 and covers the void part, thereby physically reinforcing the void part and preventing a chemical substance, which intrudes from the outside of the single cell 100, from coming into contact with the MEA 10 to chemically protect the MEA 10. From the viewpoint of ensuring the function of reinforcing the void part, the thickness of the resin sheet 60 needs to be, for example, 1 μm or more, more desirably 10 μm or more, and still more desirably 30 μm or more. In addition, from the viewpoint of suppressing the generation of a level difference caused by the provision of the resin sheet 60 and the consequent increase in the thickness in the stacking direction, the thickness of the resin sheet 60 needs to be 300 μm or less, desirably 100 μm or less, more desirably 70 μm or less, and still more preferably 50 μm or less. In addition, from the viewpoint of chemically protecting the MEA, the resin sheet 60 is preferably a dense sheet substantially having no pores. The dense sheet substantially having no pores is allowed to have a pore having a diameter of 10 μm or less as long as the influence of the chemical substance, which intrudes from the outside, is in a permissible range.

The adhesive layer 62 is formed of an adhesive and causes the resin frame 20 and the resin sheet 60 to adhere to the MEA 10. As shown in FIG. 2, the MEA 10 is caused to adhere to the resin frame 20 and the resin sheet 60 in the exposure region formed in the outer peripheral part. The adhesive layer 62 has an outer shape that is shaped in a rectangular frame shape in the position that overlaps the resin sheet 60 in the stacking direction. As the adhesive forming the adhesive layer 62, in the present embodiment, a photo-curable adhesive, more specifically, an ultraviolet (UV)-curable adhesive is used. In the case of using the UV-curable adhesive, it is possible to suppress heating necessary for the curing of the adhesive during the assembling of the MEA 10 and the resin frame 20 and to suppress the MEA 10 from being exposed to an undesirable high temperature, which is desirable. As the UV-curable adhesive, it is possible to use, specifically, for example, a polyisobutylene (PIB)-based adhesive or a silicone rubber-based adhesive. As long as the adhesive is heated in a permissible range in order to cure the adhesive during the assembling of the MEA 10 and the resin frame 20, an adhesive containing a thermoplastic resin or a thermosetting resin may also be used as the adhesive forming the adhesive layer 62.

The gas separators 40, 50 are formed of a gas impermeable conductive member, for example, a carbon member such as dense carbon that is made gas-impermeable by compressing carbon or a metal member such as pressed stainless steel. As shown in FIG. 2, the gas separators 40, 50 have a protrusion and recess shape that is intended to form a flow path through which a reaction gas, which is used for an electrochemical reaction, flows. An in-cell fuel gas flow path is formed between the gas separator 40 and the MEA 10, and an in-cell oxidation gas flow path is formed between the gas separator 50 and the MEA 10. A fuel gas containing hydrogen flows through the in-cell fuel gas flow path, and an oxidation gas containing oxygen flows through the in-cell oxidation gas flow path. The in-cell fuel gas flow path and the in-cell oxidation gas flow path are fluid flow paths in which a fluid flows in a direction perpendicular to the stacking direction of the single cells 100. FIG. 1 does not show the protrusion and recess shapes of the gas separators 40, 50.

The gas separators 40, 50 and the resin frame 20 are provided with manifold holes 31 to 36 for forming manifolds. The manifold holes are provided at positions that overlap each other in the stacking direction of the single cells 100 in the vicinities of the outer peripheries of the gas separators and the resin frame. The manifolds are flow paths that penetrate the gas separators 40, 50 and the resin frame 20, and the reaction gas or a cooling medium flows through the manifolds. The manifold holes 31, 36 form a flow path for the supply and discharge of the fuel gas with the in-cell fuel gas flow path. The manifold holes 33, 34 form a flow path for the supply and discharge of the oxidation gas with the in-cell oxidation gas flow path. In addition, the manifold holes 32, 35 form a flow path for the supply and discharge of the cooling medium with a cooling medium flow path that is formed between the single cells 100.

In the resin frame 20, a slit portion 38 having a plurality of elongated slits that extends from each manifold hole toward the outer periphery of the MEGA 18 is formed in the vicinity of each of the manifold holes 31, 33, 34, 36. Each slit forming the slit portion 38 penetrates the resin frame 20. In addition, the end part of each slit overlaps the near manifold holes formed in the gas separators 40, 50 in the stacking direction when the resin frame 20 is sandwiched between the gas separators 40, 50. In addition, each slit portion 38 causes a near manifold and the in-cell gas flow path corresponding to the manifold to communicate with each other. The manifold and the in-cell gas flow path may be caused to communicate with each other with a structure other than the slit portion 38 provided in the resin frame 20.

At the time of assembling the fuel cell, a plurality of the single cells 100 shown in FIG. 1 and FIG. 2 is stacked, and all of the single cells are fixed to each other while a fastening load is applied in the stacking direction. In such a fuel cell, the cooling medium flow path is formed between adjacent single cells 100 as described above. A gasket, not shown, is disposed between the gas separator 40 of one adjacent single cell 100 and the gas separator 50 of the other adjacent single cell 100 that is disposed adjacent to the gas separator 40. The gasket seals the cooling medium flow path. In FIG. 2, a void is provided between the cathode 16 and the CaGDL 17 in order to clearly show the positional relationship between the individual parts when seen in the stacking direction. However, in the fuel cell, the facing surfaces of the cathode 16 and the CaGDL 17 are brought into contact with each other by disposing and pressurizing the CaGDL 17 on the MEA 10, and furthermore, by applying the fastening load to the fuel cell.

Manufacturing Method of Fuel Cell

FIG. 3 is a flowchart of a manufacturing method of the fuel cell of the present embodiment. In addition, FIG. 4A to FIG. 4D are schematic cross-sectional views of the appearance of the fuel cell in the middle of manufacturing. Hereinafter, the manufacturing method of the fuel cell will be described based on FIG. 3 and with reference to FIG. 4A to FIG. 4D.

At the time of manufacturing the fuel cell, first, the MEA 10 is manufactured (Step T100). Specifically, the anode 14 and the cathode 16 need to be formed on the electrolyte membrane 12 by manufacturing catalyst ink containing a polymer electrolyte and a catalyst-carrying carbon dispersed in a solvent, and applying the manufactured catalyst ink onto the electrolyte membrane 12 or transferring the catalyst ink applied on a substrate onto the electrolyte membrane 12.

After that, the MEA 10 and the AnGDL 15, which is the gas diffusion layer on the anode side, are assembled together (Step T110). The appearance in Step T110 is shown in FIG. 4A. In Step T110, the MEA and the AnGDL can be assembled together by, for example, pressing at room temperature. The structure obtained by assembling the MEA 10 and the AnGDL 15 is also referred to as an AnMEGA 80 (refer to FIG. 4C described below).

Figure 4B:
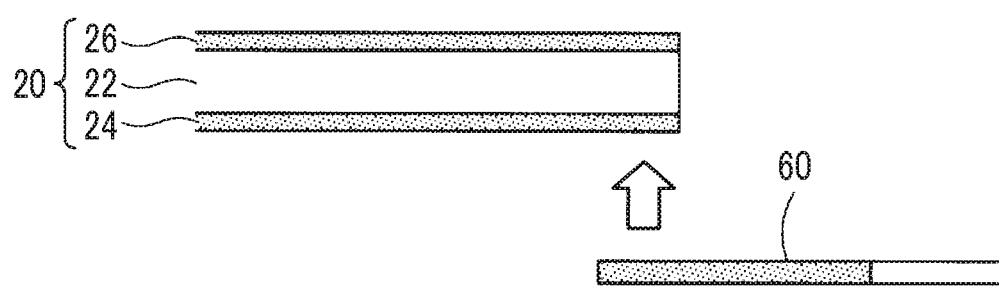
FIG. 4B is a schematic cross-sectional view of the appearance of the fuel cell in the middle of manufacturing.

In addition, the outer peripheral part of the resin sheet 60 and the inner peripheral part of the resin frame 20 are caused to overlap each other and assemble together (Step T120). The appearance in Step T120 is shown in FIG. 4B. In Step T120, the resin frame and the resin sheet can be assembled together by, for example, hot pressing. Alternatively, the resin frame 20 and the resin sheet 60 may be assembled together by thermal welding such as ultrasonic welding. The structure obtained by assembling the resin frame 20 and the resin sheet 60 is also referred to as a frame sheet 28 (refer to FIG. 4C described below). In FIG. 2, FIG. 4C described below, and the like, a level difference as large as the thickness of the resin sheet 60 is depicted in the assembled part of the resin frame 20 and the resin sheet 60. However, the resin sheet 60, which is formed of a thermoplastic resin, melts during the assembling of the resin frame 20 and the resin sheet 60, and thus it becomes possible to substantially eliminate the level difference.

After that, an adhesive is applied onto the MEA 10 of the AnMEGA 80, the frame sheet 28 is stacked on the adhesive, and then the adhesive is cured (Step T130). Specifically, the adhesive is applied so as to cover the exposure region in the outer peripheral part of the MEA 10, and the frame sheet 28 is caused to overlap the applied adhesive. The appearance in Step T130 is shown in FIG. 4C. In the present embodiment, the adhesive is cured by UV irradiation. In the following description, a layer formed by the application of an adhesive as described above will be referred to as the adhesive layer 62 regardless of whether or not the adhesive is cured.

After that, on the MEA 10, the CaGDL 17, which is the cathode-side gas diffusion layer, is stacked inside the inner periphery of the resin frame 20 (Step T140). In addition, the stacked body obtained in Step T140 is sandwiched between the gas separators 40, 50 and hot-pressed (Step T150), thereby assembling the resin frame 20 and the gas separators

40, 50. The appearance from Step T140 to Step T150 is shown in FIG. 4D. With Step T150, the single cell 100 is obtained.

In the present embodiment, the adhesive is applied in Step T130 such that the inner periphery of the adhesive layer 62 overlaps the cathode 16 when seen in the stacking direction, and as a result, the entire region that overlaps the CaGDL 17 in the stacking direction (first membrane exposure region) in the exposure region of the MEA 10 is covered with the resin sheet 60 or the adhesive layer 62. This configuration protects the electrolyte membrane 12 in the exposure region against damage caused by the contact with the CaGDL 17.

After the CaGDL 17 is stacked in Step T140, the entire MEGA 18 may be pressed in the stacking direction prior to Step T150. In the present embodiment, as shown in FIG. 2, in the exposure region of the MEA 10, there is a part of the adhesive layer 62 that is not covered with the resin sheet 60 in a part inside the inner periphery of the resin sheet 60, that is, on the side toward the central portion side of the MEA 10 (the side in the X direction in the cross-section of FIG. 2), specifically, in a range from the position B to position C. Therefore, the pressing of the MEGA enables the fixation of the CaGDL 17 to the AnMEGA 80 using the part of the adhesive layer 62 described above. Since the adhesive layer 62 is already cured in Step T130, the fixation strength of the CaGDL 17 to the AnMEGA 80 is lower than the fixation strength by adhesion associated with the curing of the adhesive, but the fixation is capable of suppressing the positional deviation of the CaGDL 17 during the transportation of the MEGA 18 from Step T140 to Step T150.

The operation for manufacturing the single cell 100 with the steps through Step T150 is repeated, and the obtained single cells 100 are stacked (Step T160), thereby completing the fuel cell.

With the fuel cell of the present embodiment configured as described above, the resin sheet 60 is disposed between the CaGDL 17 and the resin frame 20, and the MEA 10 so as to fill the space between the inner periphery of the resin frame 20 and the outer periphery of the CaGDL 17. That is, the resin sheet 60 is disposed so as to cover the void part of the MEA 10 through the adhesive layer 62. As described above, since the void part of the MEA 10 is physically reinforced with the resin sheet 60, it is possible to suppress the degradation of the durability of the MEA 10 even in a case where stress is concentrated in the void part of the MEA 10. Examples of the case where stress is concentrated in the void part of the MEA 10 includes a case where the temperature of the fuel cell changes and the resin frame 20 expands or contracts, a case where the electrolyte membrane 12 repeatedly swells and dries during the power generation of the fuel cell or the like, and a case where liquid water inside or outside the electrolyte membrane 12 is frozen. Unlike the part that is sandwiched between the resin frame 20 or the CaGDL 17 and the AnGDL 15 and is thus suppressed from changing the shape, the void part is prone to stress concentration, but the reinforcement of the part enables an improvement in the durability of the entire fuel cell.

Furthermore, with the fuel cell of the present embodiment, the resin sheet 60 is provided in the void part of the MEA 10, whereby it is possible to prevent a chemical substance, which intrudes from the outside of the single cell 100, from coming into contact with the MEA 10 and to chemically protect the MEA 10. Hereinafter, an example in which the MEA 10 is chemically protected will be described.

FIG. 5 is a schematic cross-sectional view of the schematic configuration of a single cell 100a as a comparative example. The single cell 100a has the same configuration as the single cell 100 of the first embodiment except that the single cell does not have the resin sheet 60. Therefore, common parts are denoted by the same reference numeral as in the single cell 100. FIG. 5 shows the cross-section at the same position as in FIG. 2. In the adhesive layer 62, there is a case where a bubble is generated in the adhesive layer during the process of forming the adhesive layer 62. In addition, at the time of applying the adhesive, there is a case where a part that is not coated with the adhesive, a part in which the thickness of the adhesive applied is relatively thin, or the like is generated. As a result, in the adhesive layer 62, there is a case where a fine defect 63 is generated. The fine defect causes the surface of the electrolyte membrane 12 and the outside of the adhesive layer 62 to communicate with each other as shown in FIG. 5. In addition, the oxidation gas flow path is formed on the adhesive layer 62, and a fine iron-based foreign substance may be mixed into the oxidation gas flow path from the outside. It is known that, during the power generation of a fuel cell, hydrogen peroxide is generated due to a side reaction of an electrochemical reaction and a radical such as a hydroxyl radical is further generated from the hydrogen peroxide. Such a radical causes a reaction that decomposes the polymer electrolyte that forms the electrolyte membrane 12 and may cause the deterioration of the electrolyte membrane 12. As described above, when there is an iron-based foreign substance in the in-cell oxidation gas flow path, a chemical reaction in which a hydroxyl radical is generated from hydrogen peroxide using divalent iron as a catalyst (the Fenton reaction) proceeds, and thus the generation of the hydroxyl radical is promoted. With the present embodiment, the defect 63 in the adhesive layer 62 is covered with the resin sheet 60, whereby the iron-based foreign substance or the like, which serves as the catalyst, is prevented from coming into contact with the MEA 10, and it is possible to suppress the generation of the hydroxyl radical and to suppress the deterioration of the electrolyte membrane 12.

Hereinafter, the result of confirming the chemical protection effect of the resin sheet 60 will be described. As fuel cells having a difference solely in the presence or absence of the resin sheet 60, a single cell 100 that is the same as in FIG. 2 and a single cell 100a that is the same as in FIG. 5 were manufactured. At this time, for the single cell 100a of a comparative example, the adhesive layer 62 was observed with an optical microscope after the formation of the adhesive layer 62, and a plurality of defects 63 having a diameter of approximately several hundred micrometers was found. Then, fine stainless steel particles (SUS304, diameter: 100 μm) were disposed as the iron-based foreign substance on the defects 63, and the single cells 100a were assembled together to obtain a fuel cell of a comparative example. In contrast, in the single cell 100, the same number of fine stainless steel particles described above as in the single cell 100a were disposed on the resin sheet 60, thereby obtaining a fuel cell. In addition, each of the fuel cells was supplied with the fuel gas and the oxidation gas and was caused to generate power.

Each of the fuel cells was disposed in an apparatus capable of temperature control, was caused to generate power, and was subjected to a hot/cold cycle experiment and a deterioration acceleration experiment. In the hot/cold cycle experiment, the temperature of the fuel cell during power generation was raised and lowered at a constant frequency between −30° C. and a temperature higher by 10° C. than the average operating temperature of the fuel cell during normal power generation, and the occurrence of the gas leak from the electrolyte membrane 12 was periodically inspected. In the deterioration acceleration experiment, the fuel cell was caused to continuously generate power at a constant acceleration temperature that was higher than the average operating temperature of the fuel cell during normal power generation, and the state of gas leak from the electrolyte membrane 12 was periodically inspected. The state of gas leak from the electrolyte membrane 12 was determined by causing hydrogen to flow in the in-cell fuel gas flow path, simultaneously, causing nitrogen to flow in the in-cell oxidation gas flow path, and measuring the amount of hydrogen that had permeated the in-cell oxidation gas flow path. As a result, it was possible to specify the point in time where the gas leak rapidly increased with the progress of the deterioration of the electrolyte membrane 12. In both the hot/cold cycle experiment and the deterioration acceleration experiment, in the single cell 100 including the resin sheet 60, it was possible to extend the time taken until the increase in the gas leak 1.6 times compared with the time in the single cell 100a of the comparative example (data not shown).

Second Embodiment

Figure 6A:
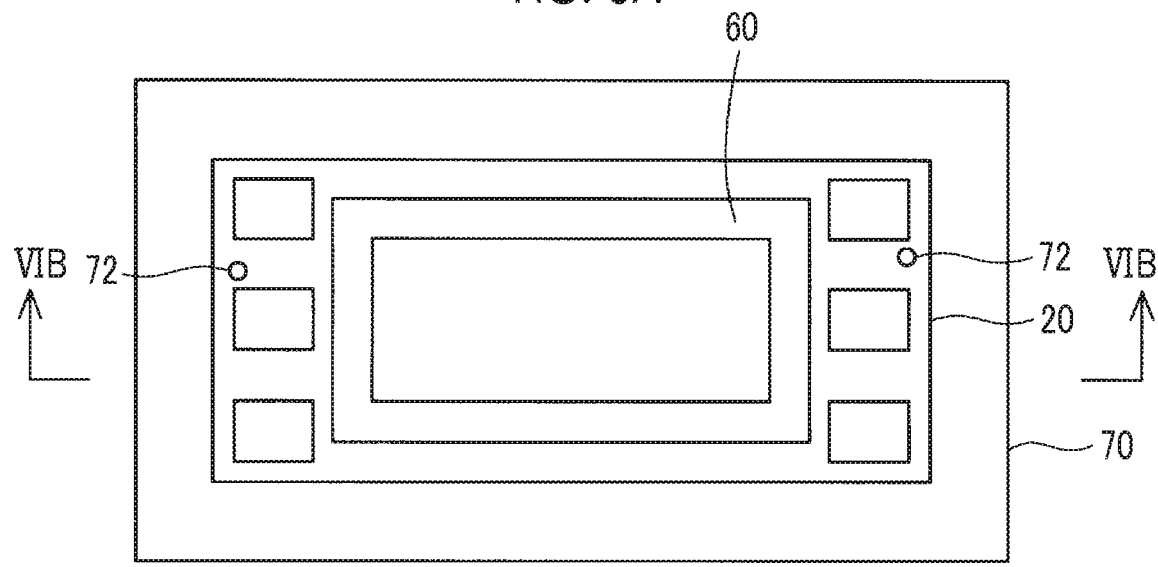
FIG. 6A is a plan view of the appearance of a resin frame and a resin sheet placed on a clamping jig.
Figure 6B:
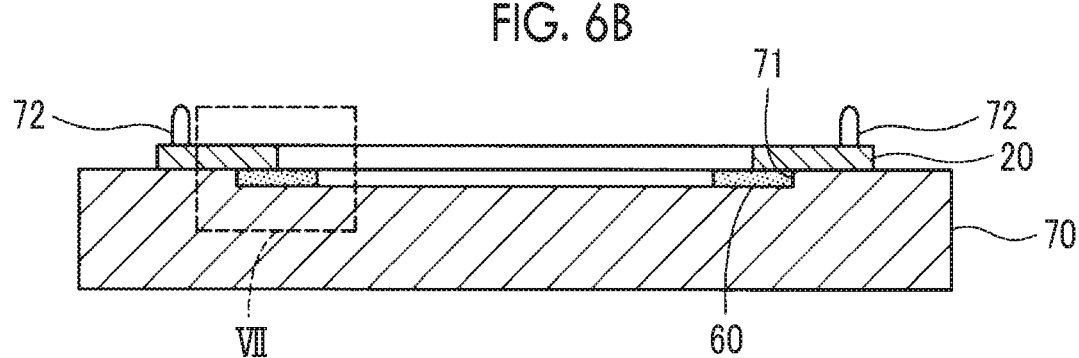
FIG. 6B is a cross-sectional view of the appearance of the VIB-VIB cross-section in FIG. 6A.
Figure 7:
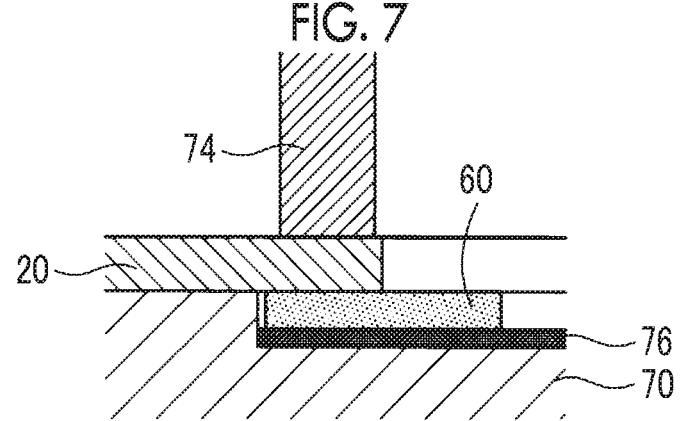
FIG. 7 is an enlarged view of the region VII in FIG. 6B.

FIG. 6A, FIG. 6B, and FIG. 7 are explanatory views of the configuration of a jig used when the resin sheet 60 is assembled to the inner peripheral part of the resin frame 20 by ultrasonic welding in Step T120 of FIG. 3. The ultrasonic welding of the resin frame 20 and the resin sheet 60 is carried out as described below. The region in which the inner peripheral part of the resin frame 20 and the outer peripheral part of the resin sheet 60 overlap each other is sandwiched between an ultrasonic horn 74 (hereinafter, referred to as the horn 74) and a clamping jig 70 with a sticking suppression portion 76 interposed between the ultrasonic horn and the clamping jig, and ultrasonic vibrations are transmitted to the resin frame 20 and the resin sheet 60 from the horn 74. Hereinafter, the operation of assembling the resin frame 20 and the resin sheet 60 by ultrasonic welding in Step T120 will be described as a second embodiment using FIG. 6A, FIG. 6B, and FIG. 7.

FIG. 6A is a plan view of the appearance in which the resin sheet 60 and the resin frame 20 are placed in this order on the clamping jig 70 such that the inner peripheral part of the resin frame 20 and the outer peripheral part of the resin sheet 60 overlap each other. FIG. 6B is a cross-sectional view of the appearance of the VIB-VIB cross-section in FIG. 6A. As shown in FIG. 6B, a level difference portion 71 for positioning the resin sheet 60 is provided on the upper surface of the clamping jig 70, and the resin sheet 60 is positioned with respect to the clamping jig 70 by being disposed along the level difference portion 71. In addition, the clamping jig 70 is provided with a plurality of (two in FIG. 6A and FIG. 6B) positioning pins 72, and the resin frame 20 is provided with positioning holes at positions corresponding to the positioning pins 72. The resin frame 20 is disposed on the clamping jig 70 while the positioning pins 72 are inserted into the positioning holes, whereby the resin frame 20 is positioned with respect to the clamping jig 70.

FIG. 7 is an enlarged view of the region shown as the region VII in the cross-sectional view of FIG. 6B. FIG. 7 shows the appearance of the horn 74 that is further pressed against the region in which the resin frame 20 and the resin sheet 60 overlap each other. The horn 74 has a shape corresponding to the shape of an assembling place in which the resin frame 20 and the resin sheet 60 are to be welded. The assembling place may have, for example, a rectangular shape that continuously extends along the inner periphery of the resin frame 20, or a plurality of spot-like assembling places may be provided.

As shown in FIG. 7, in the present embodiment, on the clamping jig 70, the sticking suppression portion 76 is disposed in a range including the place that faces the horn 74 in the direction in which the resin frame 20 and the resin sheet 60 overlap each other. The sticking suppression portion suppresses the adhesion between the molten thermoplastic resin and the clamping jig 70. The sticking suppression portion 76 needs to be capable of suppressing the adhesion between the molten thermoplastic resin and the clamping jig 70 and can be formed of, for example, a non-pressure-sensitive adhesive fluororesin, specifically, polytetrafluoroethylene (PTFE), a fluorinated ethylene propylene copolymer (FEP), an ethylene tetrafluoroethylene copolymer (ETFE), or the like. The material forming the sticking suppression portion 76 needs to have a melting point higher than the temperature that the resin sheet 60, which is disposed on the clamping jig 70 as the assembly target, reaches during the ultrasonic welding, and, from the viewpoint that the melting point is high, PTFE is desirably used. The sticking suppression portion 76 can be formed by, for example, sticking a sheet formed of the material onto the clamping jig 70 in advance. Alternatively, the sticking suppression portion 76 may also be formed by applying the material onto the clamping jig 70 in advance.

With such a configuration, it is possible to suppress the thermoplastic resin, which forms the resin sheet 60, from sticking to the clamping jig 70 even when the thermoplastic resin melts during the assembling of the resin frame 20 and the resin sheet 60 by ultrasonic welding. Therefore, for example, when the frame sheet 28 is removed from the clamping jig 70 after assembling, the sticking of the frame sheet 28 to the clamping jig 70 is suppressed, and it becomes possible to suppress the damage of the frame sheet 28 caused when the stuck frame sheet 28 is peeled off.

In the second embodiment, the sticking suppression portion 76 is provided on the clamping jig 70, but the sticking suppression portion 76 may be provided on the horn 74 in addition to or instead of such a configuration. Generally, the temperature distribution becomes higher as the clamping jig 70 is farther from the horn 74; however, in a case where the resin melts on the horn 74, the sticking suppression portion 76 is preferably provided on the horn 74.

In addition, in the second embodiment, when the resin frame 20 and the resin sheet 60 are disposed on the clamping jig 70, the resin frame 20 and the resin sheet 60 are overlapped such that the resin sheet 60 comes on the clamping jig 70 side, but this configuration may vary. The resin frame 20 and the resin sheet 60 may be overlapped such that the resin frame 20 comes on the clamping jig 70 side, and the sticking suppression portion 76 may be disposed between the clamping jig 70 and the resin frame 20.

Third Embodiment

Figure 8:
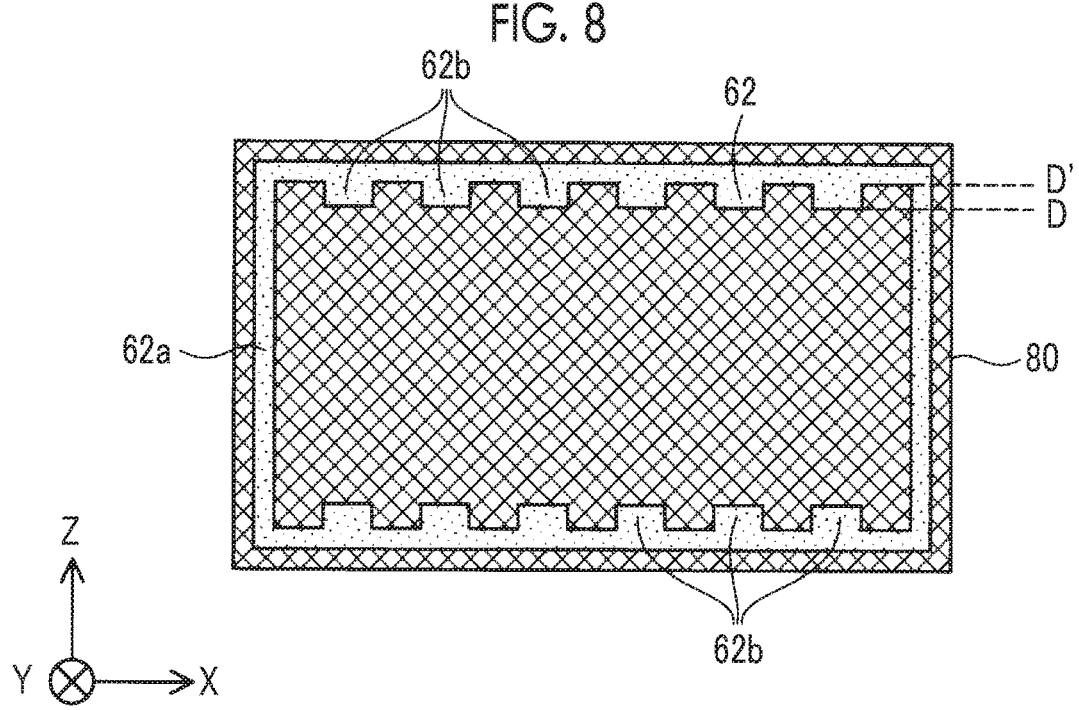
FIG. 8 is a plan view of the appearance of an adhesive applied onto an AnMEGA.
Figure 9:
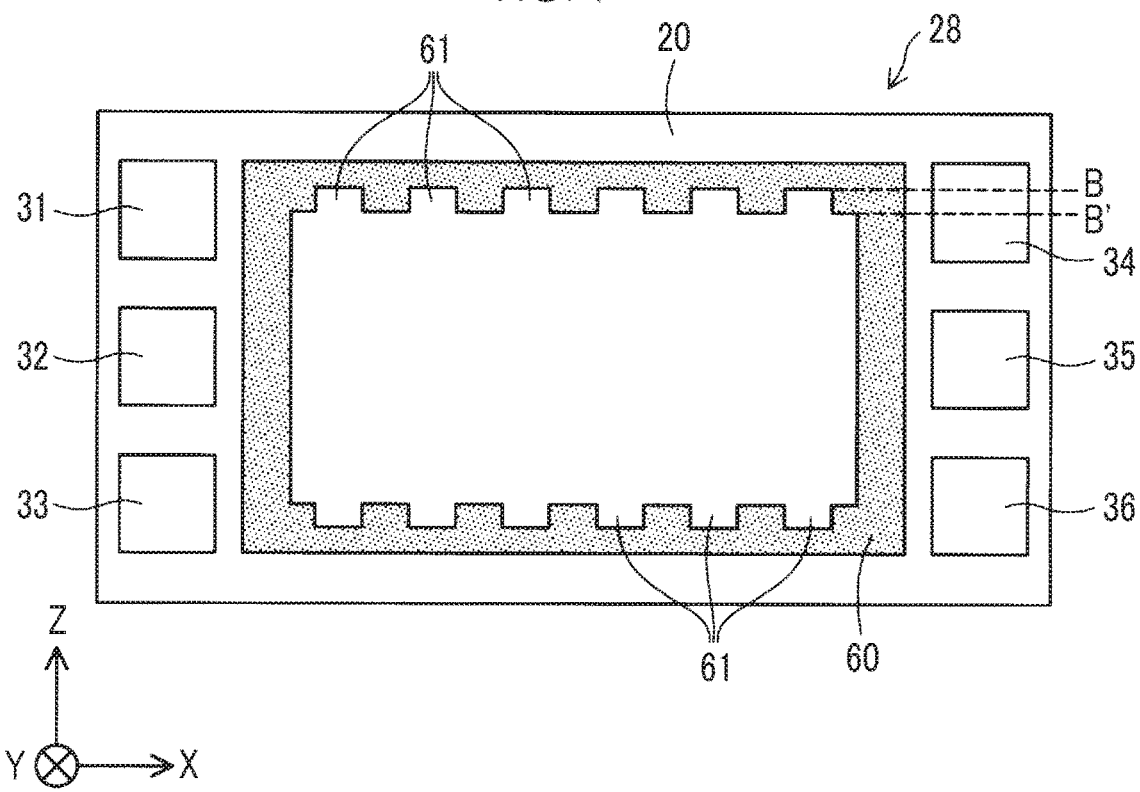
FIG. 9 is a plan view of a frame sheet.
Figure 10:
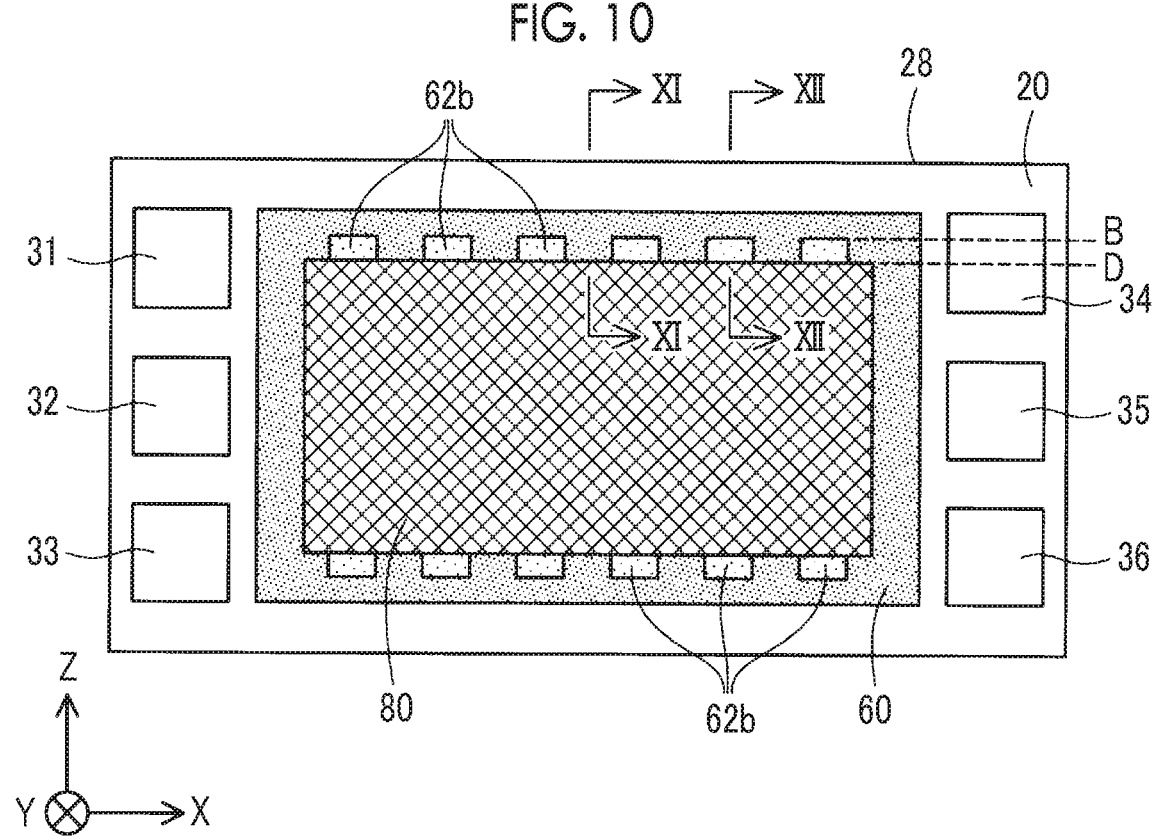
FIG. 10 is a plan view of the appearance of the AnMEGA and the frame sheet adhering to each other.
Figure 11:
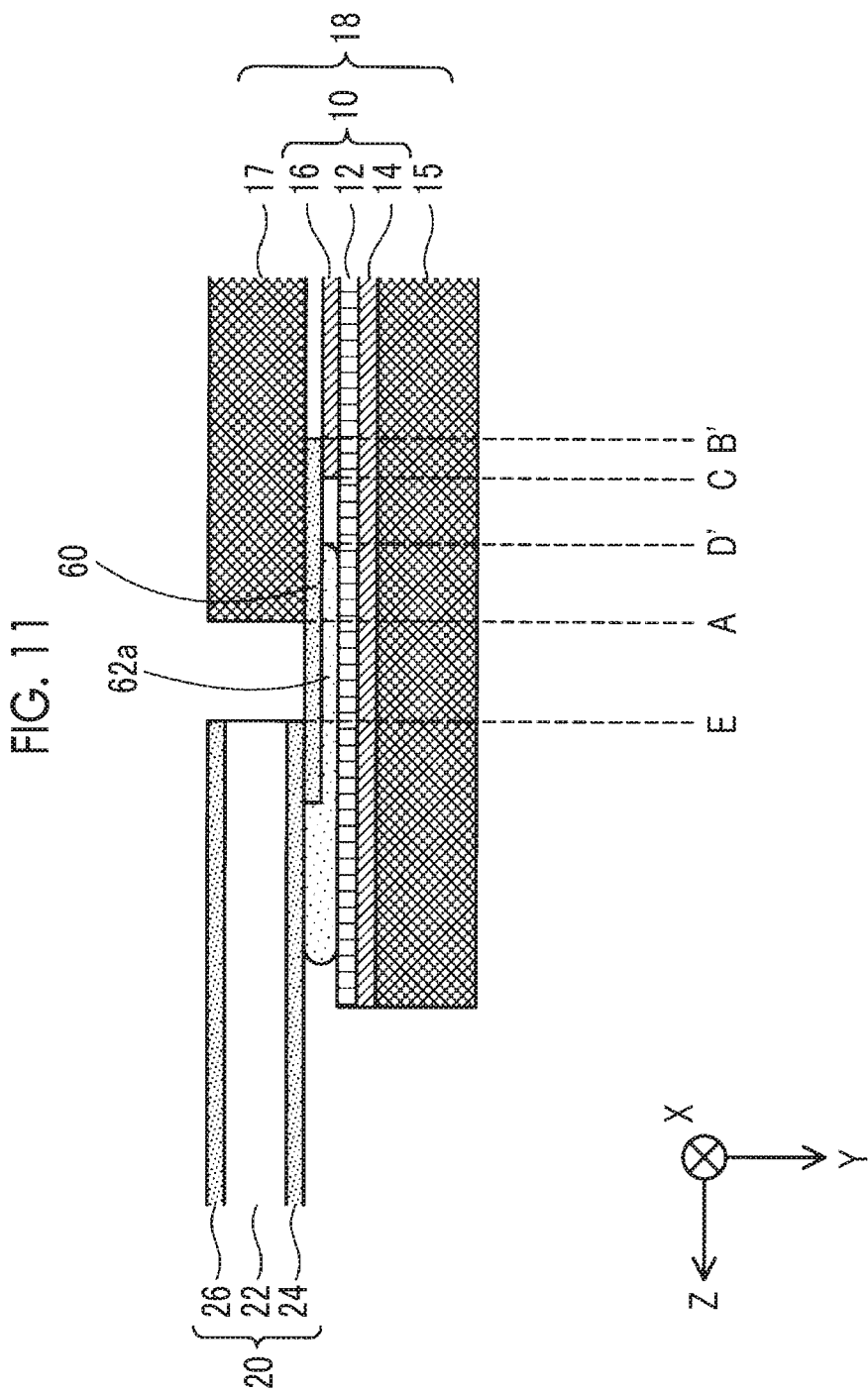
FIG. 11 is a schematic cross-sectional view of the appearance of the XI-XI cross-section in FIG. 10.
Figure 12:
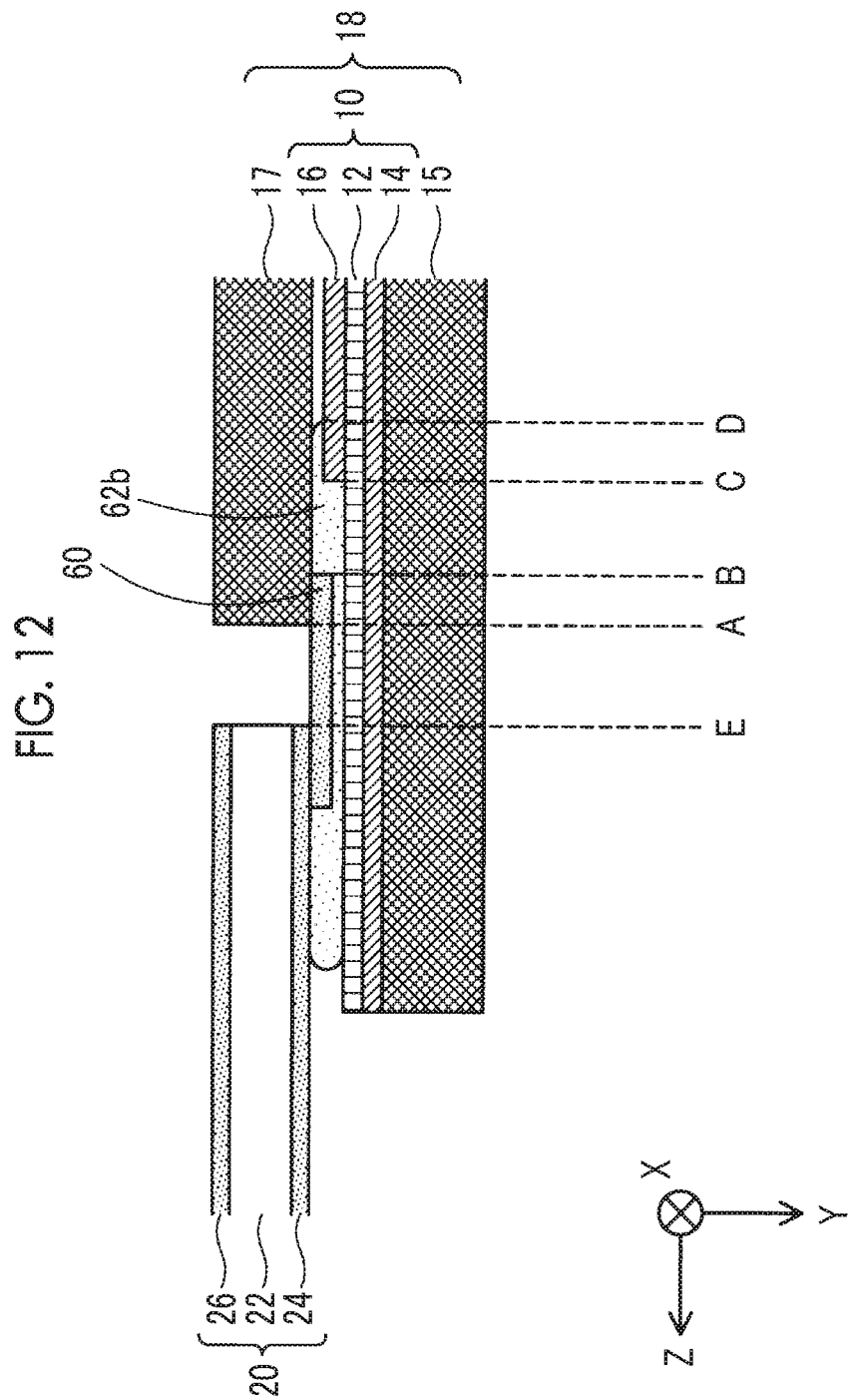
FIG. 12 is a schematic cross-sectional view of the appearance of the XII-XII cross-section in FIG. 10.

FIG. 8 is a plan view of the appearance in which the adhesive, which is to form the adhesive layer 62, is applied onto the AnMEGA 80 in Step T130 of the manufacturing process of a fuel cell of a third embodiment. FIG. 9 is a plan view of the frame sheet 28 manufactured in Step T120. FIG. 10 is a plan view of the appearance in which the AnMEGA 80 and the frame sheet 28 are caused to adhere to each other in Step T130. In addition, FIG. 11 is a schematic cross-sectional view of the appearance of the XI-XI cross-section in FIG. 10, and FIG. 12 is a schematic cross-sectional view of the appearance of the XII-XII cross-section in FIG. 10. FIG. 10 shows the appearance before the CaGDL 17 is stacked, but FIG. 11 and FIG. 12 show the appearance after the CaGDL 17 is stacked in order to facilitate the understanding of the positional relationship between the individual parts. The fuel cell of the third embodiment has the same configuration as the fuel cell of the first embodiment except that the shape of the resin sheet 60 and the shape of the adhesive layer 62 are different, and the fuel cell is manufactured by the same manufacturing method. In the third embodiment, parts common to the first embodiment are denoted by the same reference numeral, and common manufacturing steps are denoted by the same step number.

As shown in FIG. 8, in the fuel cell according to the third embodiment, the adhesive layer 62, which coats the AnMEGA 80, includes a frame-shaped portion 62a and a plurality of protrusion portions 62b. The frame-shaped portion has an outer shape that is shaped in a rectangular frame shape. The protrusion portions are formed to be wider than the frame-shaped portion 62a and are provided so as to protrude toward the central portion side of the AnMEGA 80 (hereinafter, also simply referred to as the "central portion side") from the parts of the frame-shaped portion 62a that extend in the X direction. In addition, as shown in FIG. 9, the resin sheet 60 of the third embodiment is provided with a plurality of cutout portions 61 in the inner peripheral parts of the parts that extend in the X direction. As shown in FIG. 10, when the AnMEGA 80 and the frame sheet 28 are caused to overlap and adhere to each other, the protrusion portions 62b of the adhesive layer 62 are respectively exposed through the cutout portions 61 of the resin sheet 60.

The XI-XI cross-section in FIG. 10, which is shown in FIG. 11, is a cross-section at a place in which the cutout portion 61 is not formed in the resin sheet 60. In such a cross-section, as shown in FIG. 11, the inner peripheral part of the resin sheet 60 and the outer peripheral part of the cathode 16 overlap each other. In addition, in the cross-section of FIG. 11, the frame-shaped portion 62a in the adhesive layer 62 is shown, and the inner periphery of the frame-shaped portion 62a is disposed on the outer peripheral side (the side in the Z direction in the cross-section of FIG. 11) of the inner periphery of the resin sheet 60. In FIG. 11, when seen in the stacking direction, a position that overlaps the inner periphery of the resin sheet 60 is indicated as the "position B'", and a position that overlaps the inner periphery of the adhesive layer 62 is indicated as the "position D'". The position B' and the position D' are also shown in FIG. 8 and FIG. 9.

In the cross-section of FIG. 11, the overlap between the inner peripheral part of the resin sheet 60 and the outer peripheral part of the cathode 16, that is, the length from the position C to the position B' needs to be determined depending on the accuracy of the position alignment during the manufacturing of the single cell 100 such that the resin sheet 60 covers all of the first membrane exposure region of the MEA 10 (the region in which the exposure region overlaps the CaGDL 17 when seen in the stacking direction). In addition, in the cross-section of FIG. 11, the inner peripheral part of the adhesive layer 62 needs to be covered with the resin sheet 60. Therefore, the adhesive layer 62 may be provided to extend toward the central portion side such that the inner periphery of the adhesive layer comes into contact with the cathode 16 or the position D', which is the inner periphery of the adhesive layer 62, or may be disposed on the outer peripheral side (the side in the Z direction in the cross-section of FIG. 11) of the position A, which is the outer periphery of the CaGDL 17.

The XII-XII cross-section in FIG. 10, which is shown in FIG. 12, is a cross-section at a place in which the cutout portion 61 is formed in the resin sheet 60. In such a cross-section, as shown in FIG. 12, the protrusion portion 62b in the adhesive layer 62 is shown, the inner periphery (position D) of the protrusion portion 62b is disposed on the central portion side (the side in the negative Z direction in the cross-section of FIG. 12) of the inner periphery (position B) of the resin sheet 60, and the inner peripheral part of the adhesive layer 62 and the outer peripheral part of the cathode 16 overlap each other. The position B and the position D are also shown in FIG. 8 and FIG. 9.

In the cross-section of FIG. 12, the overlap between the inner peripheral part of the adhesive layer 62 and the cathode 16, that is, the length from the position C to the position D needs to be determined depending on the accuracy of the position alignment during the manufacturing of the single cell 100 such that the adhesive layer 62 covers all of the first membrane exposure region of the MEA 10 (the region in which the exposure region overlaps the CaGDL 17 when seen in the stacking direction). The length from the position C to the position D in FIG. 12 may be equal to or different from the length from the position C to the position B' in FIG. 11. In the present embodiment, the length from the position C to the position D in FIG. 12 is set to be equal to the length from the position C to the position B' in FIG. 11. In addition, in the cross-section of FIG. 12, the overlap between the inner peripheral part of the resin sheet 60 and the CaGDL 17, that is, the length from the position A to the position B may be determined, similar to the first embodiment, depending on the accuracy of the position alignment during the manufacturing of the single cell 100 such that the resin sheet 60 fills the void part (the part of the MEA 10 that overlaps the gap between the inner periphery of the resin frame 20 and the outer periphery of the CaGDL 17 in the stacking direction) without any gap.

With such a configuration, it becomes possible to fix the CaGDL 17 to the AnMEGA 80 with the protrusion portions 62b of the adhesive layer 62, which are exposed through the cutout portions 61 of the resin sheet 60. Therefore, it is possible to suppress the positional deviation of the CaGDL 17 during the transportation of the MEGA 18 from Step T140 to Step T150. Furthermore, the adhesive layer 62 of the present embodiment is covered with the resin sheet 60 except for the places exposed through the cutout portions 61. Therefore, it is possible to suppress the volatilization of a volatile component from the adhesive, which forms the adhesive layer 62, when the temperature increases during the manufacturing step or power generation of the fuel cell and to suppress the power generation performance from being degraded by the volatile component attached to a catalyst layer such as the cathode 16. Particularly, in the present embodiment, the cutout portions 61 that expose parts of the adhesive layer 62 are provided in the parts that extend in the X direction in the inner periphery of the resin sheet 60. That is, the cutout portions 61 are provided in parts further apart from parts that approach the manifold holes, which are associated with the communication of the reaction gas, and extend in the Z direction in the inner periphery of the resin sheet 60. Therefore, it is possible to enhance the effect for suppressing the volatile component of the adhesive from being mixed into the reaction gas and being attached to the catalyst layer.

It was experimentally confirmed that, when the adhesive layer 62 is exposed through the cutout portions 61, the effect for suppressing the positional deviation of the CaGDL 17 during the transportation of the MEGA 18 can be obtained.

As a result, it was confirmed that, even when the proportion of the total area of the adhesive layer 62 exposed through the cutout portions 61 in the entire area of the first membrane exposure region (the region in which the exposure region overlaps the CaGDL 17 when seen in the stacking direction) of the MEA 10 is set to 30%, it is possible to obtain adhesiveness strong enough to suppress the positional deviation of the CaGDL 17 during the transportation (data not shown).

Furthermore, in the fuel cell of the third embodiment, except the protrusion portions 62b, which are exposed through the cutout portions 61, the adhesive layer 62 is the frame-shaped portion 62a that is formed to be narrower in width than the protrusion portions 62b (shorter in length in the Z direction in the cross-sections of FIG. 11 and FIG. 12). That is, in a region in which the adhesive layer 62 does not take part in the fixation between the MEA 10 and the CaGDL 17 in the first membrane exposure region of the MEA 10, there is a region that is covered with the resin sheet 60, but does not include the adhesive layer 62 formed therein. Therefore, it is possible to suppress the amount of the adhesive used while the fixation between the MEA 10 and the CaGDL 17 is ensured with the adhesive layer 62 as described above. The adhesive layer 62 may also be formed in an evenly broadened width (in a length elongated in the Z direction) such that the inner periphery of the adhesive layer 62 reaches the position D in all of the parts of the adhesive layer 62 that extend in the X direction shown in FIG. 8. Even with such a configuration, it is possible to obtain the effect for fixing the MEA 10 and the CaGDL 17 with the adhesive layer 62 that is exposed through the cutout portions 61 and the effect for suppressing the discharge of the volatile component from the adhesive layer 62 by covering the adhesive layer 62 with the resin sheet 60.

In addition, with the present embodiment, the fixation between the MEA 10 and the CaGDL 17 is ensured with the adhesive layer 62 that is exposed through the cutout portions 61 of the resin sheet 60. Therefore, there is no need for forming the adhesive layer 62 so as to further extend toward the central portion side than the end part on the central portion side in the inner peripheral part of the resin sheet 60 in order for the fixation between the MEA 10 and the CaGDL 17. Therefore, there is no case where the adhesive layer 62 formed to extend toward the central portion side narrows the region in the MEA 10, in which the electrochemical reaction proceeds, and degrades the battery performance.

The structure provided in the resin sheet 60 to expose the adhesive layer 62 does not always need to be the cutout portions 61, and a void that penetrates the resin sheet 60 in the stacking direction and allows the disposition of the adhesive therein may be formed in a part that overlaps the first membrane exposure region in the MEA 10, the adhesive layer 62, and the CaGDL 17 in the stacking direction. As such a void, it is possible to adopt a variety of aspects, for example, a through-hole or a slit provided in the resin sheet 60.

Other Embodiments

In each of the embodiments, the parts of the adhesive layer 62 that are not covered with the resin sheet 60 are provided in the first membrane exposure region of the MEA 10, and the CaGDL 17 is fixed to the AnMEGA 80 with the parts, but the configuration may also vary. As long as the positional deviation of the CaGDL 17 during the transportation of the MEGA 18 is within the permissible range, the parts of the adhesive layer 62 that are not covered with the resin sheet 60 may not be provided, and the position B, which is the inner periphery of the resin sheet 60, may be disposed on the central portion side of the position C, which is the outer periphery of the cathode 16.

In each of the embodiments, the resin frame 20 has a three-layer structure in which the core layer 22 is sandwiched between the first adhesive layer 24 and the second adhesive layer 26, which are made of a thermoplastic resin having adhesiveness, and the resin sheet is formed of a thermoplastic resin, but the configuration may also vary. For example, as long as the first adhesive layer 24 offers sufficient adhesiveness, the resin sheet 60 may be formed of a resin different from the thermoplastic resin. Alternatively, in a case where the adhesion between the resin frame 20 and the resin sheet 60 and the adhesion between the resin frame 20 and the gas separators 40, 50 are carried out by a different method, for example, the use of an adhesive, the resin frame 20 may not have the adhesive resin layer on the surface.

In each of the embodiments, as shown in FIG. 2, the anode 14 and the AnGDL 15 are larger than the cathode 16 and the CaGDL 17, and are disposed so as to spread out from the outer peripheries of the cathode 16 and the CaGDL 17, but the configuration may also vary. For example, in FIG. 2, the size relationship between the anode 14 and the AnGDL 15, and the cathode 16 and the CaGDL 17 may be reversed by switching the anode 14 and the AnGDL 15, and the cathode 16 and the CaGDL 17.

The present disclosure is not limited to the embodiments and can be realized with a variety of configurations within the scope of the gist of the present disclosure. For example, the technical features of the embodiments that correspond to the technical features in each embodiment described in the cross-section of the summary of the disclosure can be appropriately replaced or combined in order to solve part or all of the problems or to achieve part or all of the effects. In addition, unless the technical features are described as indispensable in the present specification, the technical features can be deleted as appropriate.

What is claimed is:
1. A fuel cell comprising:
   a membrane electrode assembly having electrodes disposed on both surfaces of an electrolyte membrane;
   a gas diffusion layer stacked on a first surface of the membrane electrode assembly;
   a resin frame assembled onto the first surface of the membrane electrode assembly so as to surround an outer periphery of the gas diffusion layer apart from the outer periphery of the gas diffusion layer; and
   a resin sheet disposed between the gas diffusion layer and the resin frame, and the membrane electrode assembly so as to fill a space between an inner periphery of the resin frame and the outer periphery of the gas diffusion layer, and
   further comprising an adhesive layer made of an adhesive between the resin frame, the resin sheet, and the gas diffusion layer, and the membrane electrode assembly, wherein:
   a region in the membrane electrode assembly that overlaps an outer peripheral part of the gas diffusion layer includes a membrane exposure region in which the electrode is not disposed on the first surface of the membrane electrode assembly; and
   the resin sheet includes a part that overlaps the membrane exposure region in the membrane electrode assembly, the adhesive layer, and the gas diffusion layer in a stacking direction of the gas diffusion layer; and the part includes a void that penetrates the resin sheet in the stacking direction and allows disposition of the adhesive in the void.

2. The fuel cell according to claim 1, wherein:
the membrane exposure region of the membrane electrode assembly is covered with at least one of the adhesive layer and the resin sheet; and
in the membrane exposure region of the membrane electrode assembly, a part that is covered with the resin sheet includes a region in which the adhesive layer is not disposed.

3. The fuel cell according to claim 1, further comprising a pair of gas separators that sandwiches a structure including the membrane electrode assembly, the gas diffusion layer, the resin frame, and the resin sheet, wherein:
the resin frame includes adhesive resin layers for adhesion of the gas separators on both surfaces of the resin frame, the adhesive resin layer being a layer containing a thermoplastic resin having adhesiveness; and
the resin sheet is made of a thermoplastic resin.

4. A manufacturing method of the fuel cell according to claim 3, the method comprising:
sandwiching a region in which an inner peripheral part of the resin frame and an outer peripheral part of the resin sheet overlap each other with an ultrasonic horn and a clamping jig while a sticking suppression portion configured to suppress sticking of a molten thermoplastic resin is interposed between the ultrasonic horn and the clamping jig; and
transmitting an ultrasonic vibration from the ultrasonic horn to the resin frame and the resin sheet to ultrasonically weld the resin frame and the resin sheet.

* * * * *